United States Patent [19]
Jeskey

[11] Patent Number: 4,573,082
[45] Date of Patent: Feb. 25, 1986

[54] FOCUSABLE DISPLAY SCREEN

[75] Inventor: Richard V. Jeskey, Fiskdale, Mass.

[73] Assignee: Incom, Inc., Southbridge, Mass.

[21] Appl. No.: 570,774

[22] Filed: Jan. 16, 1984

[51] Int. Cl.$^4$ ............................................. H04N 5/72
[52] U.S. Cl. .................... 358/250; 358/901; 350/96.18
[58] Field of Search ............ 358/250, 251, 252, 253, 358/901; 350/96.18

[56] References Cited
U.S. PATENT DOCUMENTS

| | | | |
|---|---|---|---|
| 2,757,302 | 7/1956 | Hughes | 358/250 |
| 2,979,632 | 4/1961 | MacMeille | 358/250 |
| 3,141,106 | 7/1964 | Kapamy | 358/250 |
| 3,544,715 | 12/1970 | Herriott et al. | 358/250 |
| 4,189,207 | 2/1980 | Fisher et al. | 350/96.25 |

Primary Examiner—Edward L. Coles, Sr.
Attorney, Agent, or Firm—Blodgett & Blodgett

[57] ABSTRACT

A contrast and resolution enhancing optical display screen has a plurality of straight, light-absorbing fibers embedded in at least a layer of the screen, the layer otherwise having uniform optical and physical properties. The fibers are so directed that the lines containing their axes converge toward the optical center of the first element of a lens system. Uniformity of image intensity is promoted. Sheets of material having fibers with the required arrangement are formed by: forming a thick slice having parallel fibers, bending the thick slice in a spheroidal mold or pattern at well below the working temperature until the fibers form the desired radial arrangement, and cutting the curved thick slice in at least two parallel chordal planes to form a thin sheet with fibers embedded in it. The fibers are disposed radially of a center outside the sheet.

22 Claims, 9 Drawing Figures (PRIOR DEVELOPMENT)

FOCUSABLE DISPLAY SCREEN

BACKGROUND OF THE INVENTION

A recent development in the improvement of resolution and of contrast on optical display screens has involved the use of a large number of light-absorbing fibers that are embedded in a layer of the screen and that are aligned in a direction which is parallel to the line-of-sight of an operator of the device. The absorption of oblique light rays of both internal and external origin has served to reduce the ordinary diffusion and halation, as well as significant amounts of reflection of ambient light from various layers of the screen. This development is especially effective when the screen is directly viewed by the operator, particularly at a distance such that the angle of view to all parts of the screen is essentially the same. Such a display screen is disclosed in commonly-assigned, co-pending patent application Ser. No. 500,623.

However, in some applications, it is desirable to pass the optical image from the face of a CRT into a system that includes one or more lenses in which the image may be focused, magnified, transmitted, projected, or otherwise manipulated and utilized. Under a certain class of such circumstances, the first or collecting lens of the lens system (which is co-axial with the fibers at the center of the screen) may receive non-uniform intensity of light from various parts of the display screen. More specifically, the intensity may diminish as a direct function of the lateral distance from the center of the screen. This is because, in screens of the class described, a given point-source of light in the phosphor layer produces, in effect, only a relatively narrow "cone" of light in response to the fibers in the screen. Clearly, such a screen passes undiminished light intensity to the collecting lens most effectively when the axis of each such "cone" passes near the center of the collecting lens. Thus, as much as possible of the emitted light falls on the effective collecting area, especially on the minimally-distorting central part of the lens. In the screens thus far described, a significant amount of light from peripheral areas does not fall in this manner on the collecting lens. This difficulty with the prior development has been obviated in a novel manner by the present invention.

It is therefore an outstanding object of the present invention to provide an image enhancing optical display screen which can be used in conjunction with a lens system to transfer a uniformly intense image.

Another object of this invention is the provision of an image-enhancing optical display screen which presents a uniform intensity of image with respect to a given viewing point.

Another object of the invention is the provision of a focusable optical display screen which is simple and integral in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of an optical display screen having a controllable light-emitting source on the one surface and light-absorbing fibers embedded uniformly and randomly in the screen. The fibers have distinct straight axes and are so directed that the lines containing the axes of the fibers converge to a point a positive finite distance in front of the screen.

More specifically, a layer of uniformly transparent material in the form of an optical display screen is provided with a plate-like matrix having uniform optical and physical properties fused to the inner surface, formed of the same material as the thick layer, except that the inner layer is provided with light absorbing fibers of equal or higher index of refraction than the material of the two layers. The absorbing fibers are oriented along the radii of a sphere centered at a chosen point in front of the screen. The screen is provided with a further inner layer which can be controllably induced to emit light, such as a conventional phosphor layer and a conductive metal backing.

A modification consists of a screen-shaped matrix of optically-transparent material with a light source (such as the conventional phosphor layer) on the inner surface the matrix having uniform index of refraction. Light-absorbing fibers with an index of refraction equal to or greater than the matrix material extend from the phosphor layer substantially all the way to the outer surface and are oriented along radii of a sphere centered at a chosen point in front of the screen.

A method of forming the screen includes the steps of: forming a thick slice having parallel light absorbing fibers embedded in it, heating the thick slice to a softening temperature on a curved surface, so that the thick slice conforms to the curved surface, and cutting the curved thick slice in at least two parallel chordal planes to produce a thinner slice in which the light absorbing fibers are aligned along radii of the curved surface.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
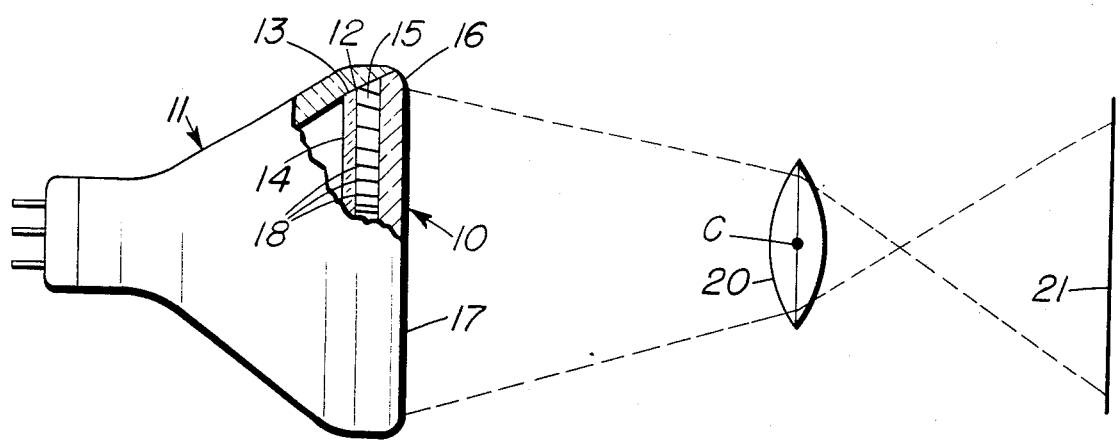
FIG. 1 illustrates a cathode ray tube having a screen embodying the present invention, and shown in use with a lens system.

The general features of the invention are best shown in FIG. 1, wherein an optical display screen embodying the present invention is referred generally by the numeral 10. The screen is installed in a cathode ray tube, indicated generally by the numeral 11, by means of a vacuum-tight seal, as by fusing. On the inner surface 12 of the screen is a light-emitting layer 13 and conductive metal backing 14, such as the conventional layer of phosphor compound with an aluminum backing. The layer 13 emits light on excitation by a focused, energetic electron beam from a cathode source (not shown). The rest of the screen consists of two layers of glass, an inner matrix 15 and a thicker outer layer 16 of standard glass with outer surface 17. Straight light-absorbing fibers 18 are embedded in the screen in the inner matrix of transparent glass 15. The CRT is illustrated in conjunction with a lens system, here represented by a first lens 20 and an image destination 21, but which may be any system for focusing, projecting, magnifying, or transmitting an optical image with lenses or the like. The fibers 18 are shown to be oriented, in the plane of the cross-section, along lines which tend to converge toward the center C of the first lens 20. A section on any plane normal to the screen would show a similar convergence, the fibers being actually oriented along radii of a sphere centered at C. An image from the screen is collected by the first lens 20, and manipulated by the lens system, such as by projecting the inverted image on the destination 21, as illustrated in FIG. 1.

Figure 2:
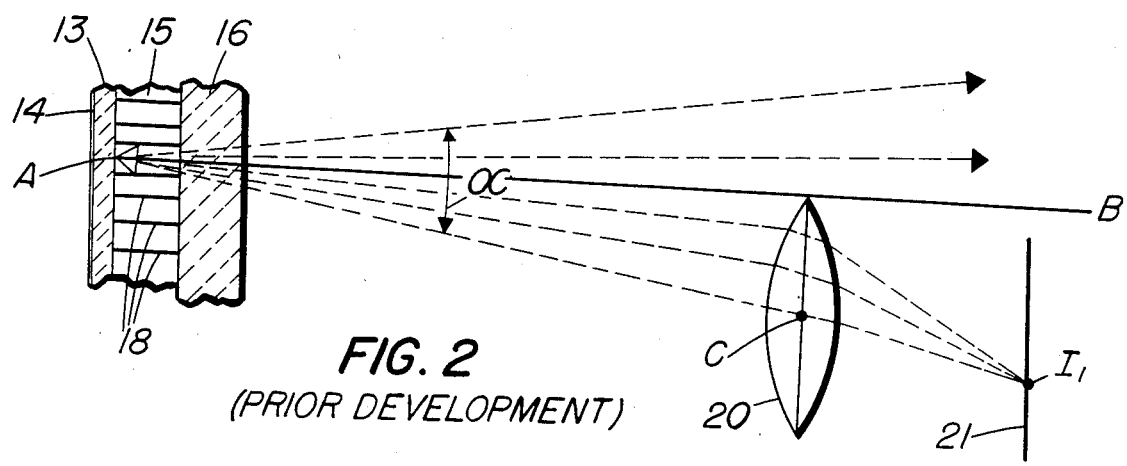
FIG. 2 illustrates a detail from a screen according to the prior development, showing how it interacts with a lens system.

Observing the absorbing fibers in a simplified manner and in one plane only, the fibers produce their main image-enhancing effect by narrowing the normally spherical emission of light from a hypothesized point-source at the phosphor layer to a "wedge" or "cone". In FIG. 2, an exemplary point A near the periphery of the screen is the source of such a cone whose angle, after absorption, is alpha ($\alpha$) in this plane. As the point A approaches the periphery, the bisector A-B of this angle passes further from the center C of the lens 20 and it becomes less likely that a significant portion of the light in the cone will be effective to form the image point I.

Figure 3:
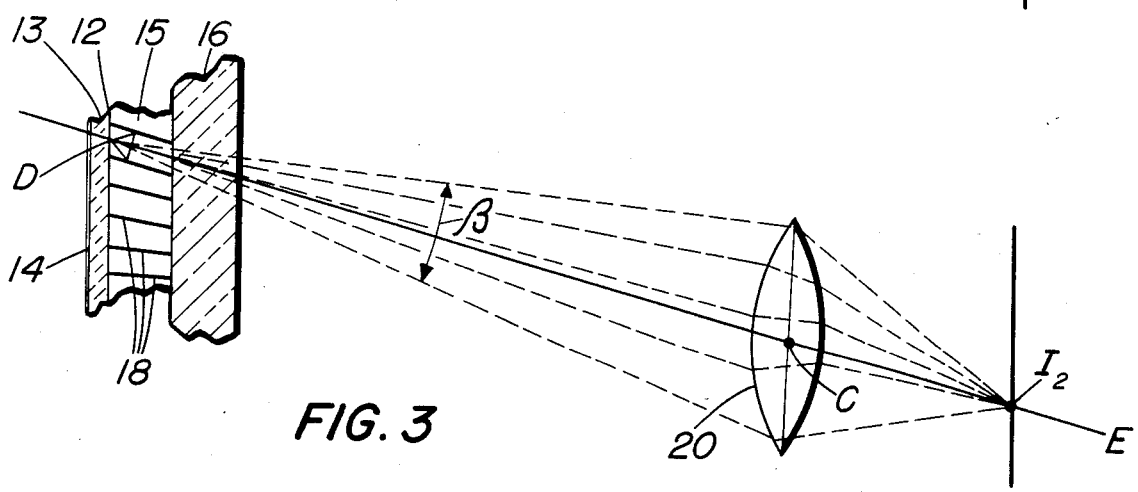
FIG. 3 shows a detail from a screen according to the present invention, showing its interaction with a lens system.

In the present invention, as illustrated in FIG. 3, the bisector D-E of the cone passes through (or near) the center C of the first lens 20. Although for a given concentration and length of fibers, the angle beta ($\beta$) will be about the same (on the average) as the angle alpha ($\alpha$), as much as possible of the light for a given size of the useful portion of a lens is effective to form the image point $I_1$. An optimum portion of the cone of light from point D is directed toward the portion of the lens which imposes minimal distortion or aberration on the image $I_2$ which appears at destination 21. It should be recalled that the same cross-sectional illustration is appropriate for any cutting plane normal to the plane of the screen, since the fibers are spherically, radially oriented.

Figure 4:
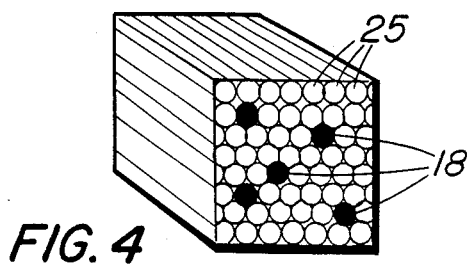
FIG. 4 illustrates the bundle-forming step in a method of manufacturing a device embodying the present invention.

A method of manufacturing a focusable optical display screen as described above begins with a bundle of parallel unclad glass fibers 25 to which bundle is added a small percentage of parallel black glass fibers 18. The distribution of the black fibers should be uniform in order to avoid uneven screen brightness and should be randomly located to avoid grating-type interference effects. A magnified volume element of such a bundle is shown in FIG. 4. Depending on the absorbing power of the black glass used for the fibers, about 1 to about 5% by volume of black fibers is added. In an effective example, about 3% black fibers were added.

Figure 5:
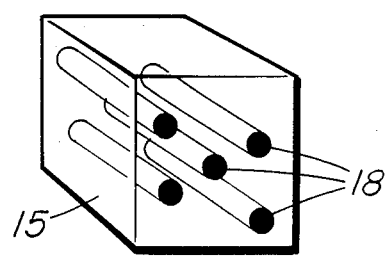
FIG. 5 illustrates the microstructure of the product formed after a fusing step of the method.
Figure 6:
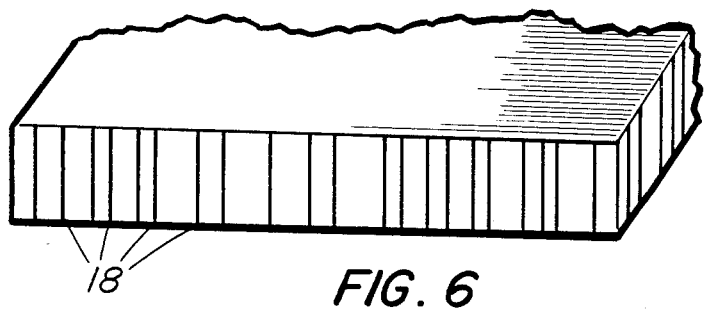
FIG. 6 illustrates a thick slice of bundled fibers formed in the performance of the method.

Fibers as thin as about 1 micron will still have an image-enhancing affect. Fibers as thick as 50 microns can be used without being individually discernable, which would degrade the image. The fibers in an effective sample were about 8 microns in diameter. They were uniformly and randomly distributed in the bundle. The bundle was then fused into an integral block. A magnified volume element of such a block is shown in FIG. 5. The parallel black fibers 18 are seen to be embedded in the transparent glass matrix 15 which has uniform optical and physical properties, including indices of refraction and thermal expansion, due to the fusing of unclad fibers to form the matrix. The block is then cut into a thick slice, using known cutting methods, perpendicularly to the absorbing fibers. A portion of such a thick slice is shown in FIG. 6 with the fibers 18 vertically disposed in the slice.

Figure 7:
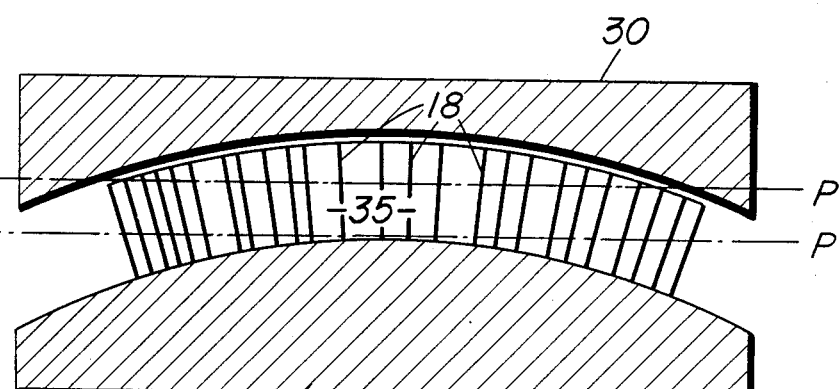
FIG. 7 illustrates a curvature-forming step.

The thick slice is then placed in a pattern or mold 30 having a spheriodal surface of chosen radius of curvature, as shown in cross-section in FIG. 7. The mold should be suitably provided with well known mold-release materials appropriate for semi-molten glass. The slice is then heated sufficiently to allow it to be molded to a curvature conforming to that of the mold or pattern.

This molding should be done at a temperature at which "elastic-like" deformation takes place rather than "plastic-like" deformation, so that the fibers become radially disposed. The deformation can be accomplished very slowly between the strain temperature of typically about 437° C. and the annealing temperature of typically about 482° C. This latter temperature represents viscosity of about $10^{13}$ poise. The deformation may be accomplished quicker, but without fatal plastic deformation, between the annealing temperature of typically about 482° C. and the softening temperature of about 716° C. The softening temperature corresponds to a viscosity of about $10^{7.6}$ poise. Above the softening temperature there is danger of plastic deformations and diffusion of the black fibers, especially as the working temperature is approached. The working temperature is typically about 1115° C. and corresponds to a viscosity of around $10^4$ poise.

The resulting curved slice is then cut on two parallel chordal planes, $P_1$ and $P_2$ (seen edge-on in FIG. 7). The positions of the planes are chosen to avoid intersecting the curved surfaces, at least in the central area.

Figure 8:
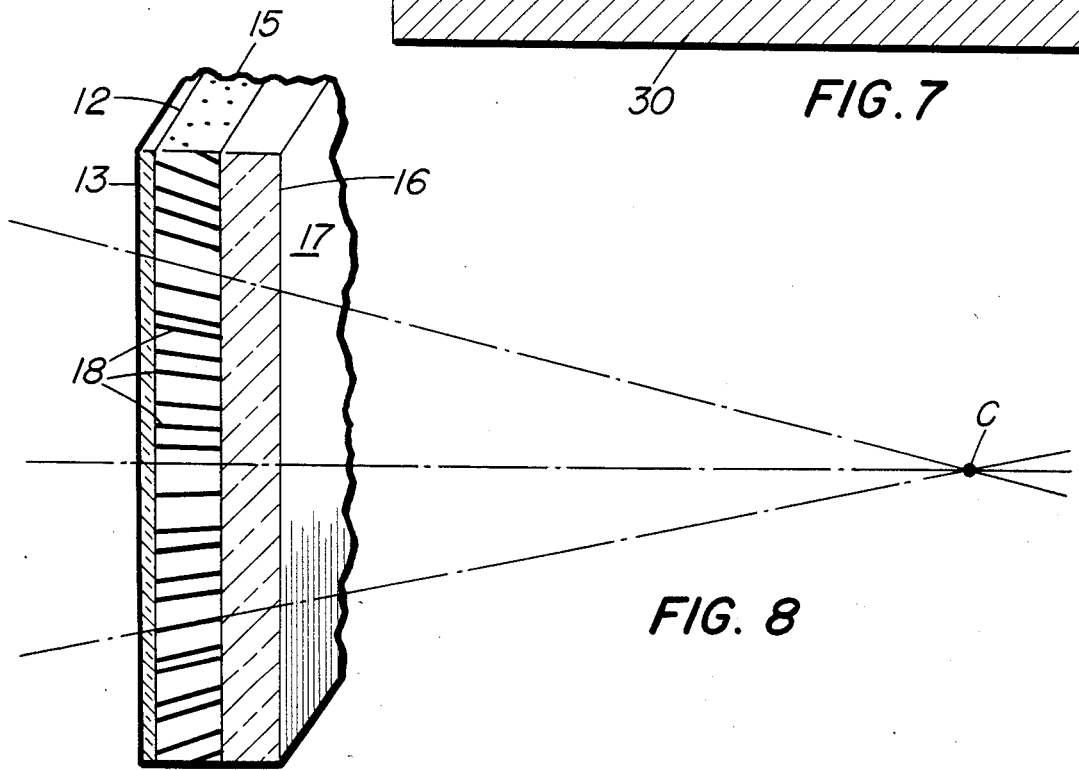
FIG. 8 is a section of a screen formed according to the method, and FIG. 9 comprises three graphs comparing the intensities of the images formed from a given phosphor output by the prior development and by the present invention.

The thin slice 35 which is thus formed consists of a layer having parallel surfaces and fibers oriented along lines corresponding to the radii of the spheriodally bent thick slice. As shown in FIG. 8, the thin slice then becomes the inner layer or matrix 15 of the screen 10 and the light-emitting layer 12 is applied by known methods to what will eventually be the inner surface of the tube 11. In the preferred embodiment, an additional outer layer 16 of transparent material having the same index of refraction and coefficient of thermal expansion as the matrix is fused or otherwise attached, for instance, by the use of a carefully-formulated adhesive, to assure that the interface between the outer layer and the fiber carrying layer is non-reflecting and non-refracting. By selecting the coefficients of thermal expansion to be identical, delamination and "crazing" are prevented.

In the latter embodiment, the outer layer is preferably ¼ inch to ¾ inch thick in order to achieve the strength to hold high vacuum and to maintain the required resistance to high voltage.

An inner layer with a thickness on the order of 0.05 inches (about 1.3 millimeters) is found to significantly enhance the image on the screen. This thickness will be adjusted along with the thickness and percentage of absorbing fibers to achieve the optimum cone of view for a particular application.

Figure 9:
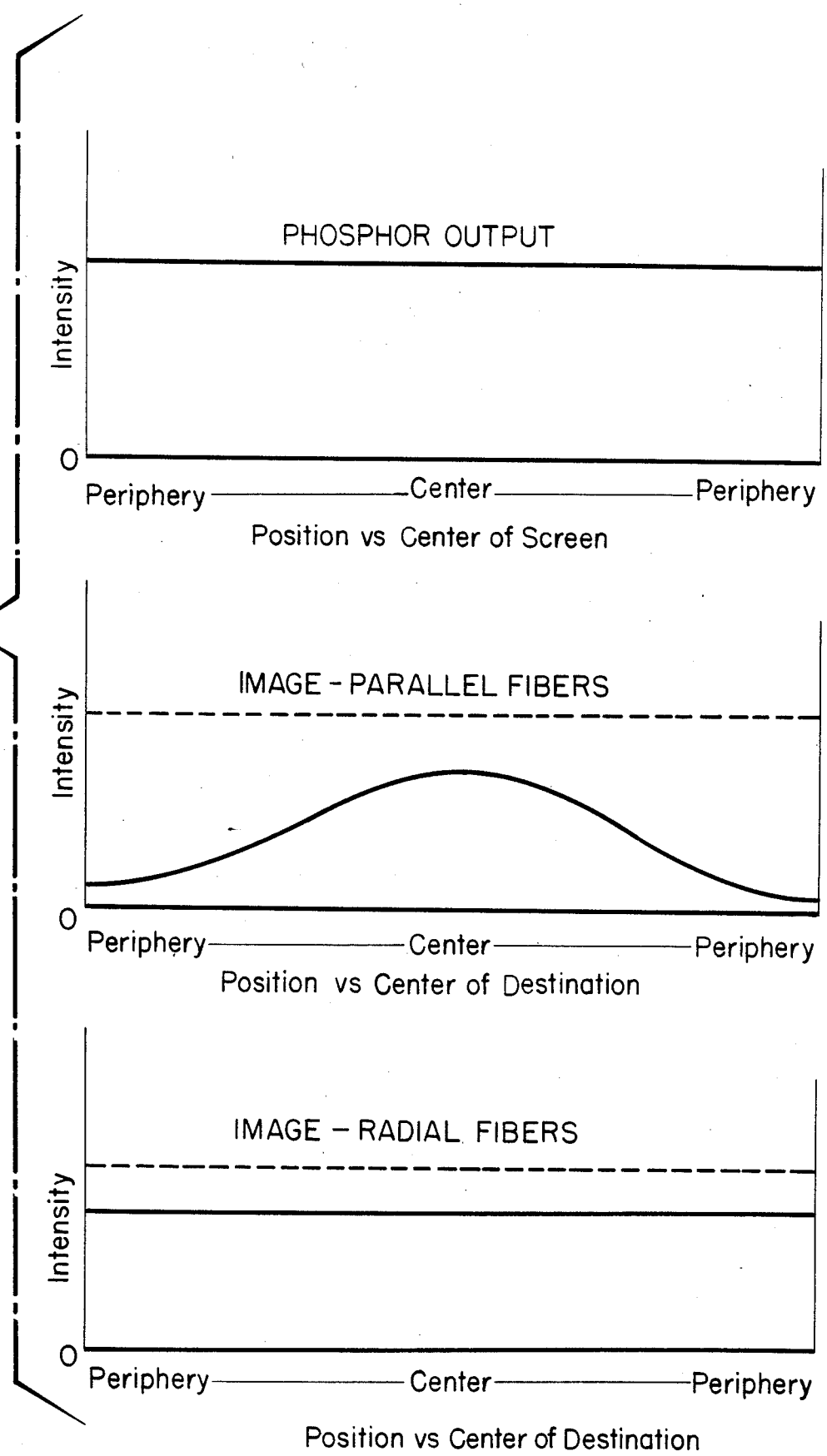

In FIG. 9, a qualitative graphic comparison is made between the image through a lens system of a screen according to the prior development, which operates by favoring the passage of light components which are normal to the screen, and the image produced by a screen according to the present invention with fibers radially converging towards the center of the collecting lens of the lens system. The output of the phosphor layer is assumed to have relatively uniform intensity from the center of the screen toward the periphery, as shown in the upper graph.

As the central graph illustrates, the nearer a point is to the periphery, the less the cone of light from that point intersects with the central portion of the collecting lens of the system, and the less intense the image corresponding to that point.

The bottom graph illustrates the activity of the present invention. Although there may be a slight lessening of the intensity of the image for certain choices of fiber length, concentration, and thickness, the image is uniformly proportional to the phosphor output from the center to the edge of the screen. Thus, a uniformly intense image is collected by this first lens and passed to the rest of the system for further processing.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An optical display screen, comprising:
   (a) an optically-transparent matrix of material of uniform index of refraction and coefficient of thermal expansion and of substantially uniform thickness, having inner and outer surfaces,
   (b) a layer of material on the inner surface adapted to be controllably induced to emit light, and
   (c) a plurality of straight, elongated light-absorbing fibers having distinct axes, the fibers being integrally embedded in said transparent layer and so directed that the lines containing the axes of the absorbing fibers converge a positive, finite distance in front of the screen, the matrix and fibers together constituting a transparent layer.

2. Display screen as recited in claim 1, wherein absorbing fibers scan substantially the enitre distance from the inner to the outer surfaces.

3. Display screen as recited in claim 1, wherein the matrix of said transparent layer is a clear glass formulation, and said fibers are of a light-absorbing glass formation.

4. Display screen as recited in claim 1, wherein said fibers are uniformly distributed in said transparent layer.

5. Display screen as recited in claim 1, wherein said fibers are uniformly, randomly distributed in said transparent layer.

6. Display screen as recited in claim 5, wherein said fibers constitute from about 1% to about 5% by volume of the transparent layer.

7. Display screen as recited in claim 5, wherein the total volume of said fibers constitutes on the close order of 3% of the volume of said transparent layer.

8. Display screen as recited in claim 6, wherein the average diameter of said fibers is from about 1 micron to about 50 microns.

9. Display screen as recited in claim 6, wherein said fibers are drawn to an average diameter on the order of 8 microns.

10. An optical display screen, comprising:
    (a) an outer layer of uniformly optically transparent material, having inner and outer substantially parallel surfaces,
    (b) an inner layer comprising a matrix of optically-transparent material having uniform optical and physical properties and a plurality of elongated, light-absorbing fibers having distinct axes, the fibers being integrally embedded in said matrix, with the lines containing the axes of the fibers converging a positive, finite distance in front of the screen, said inner layer having an inner surface, and
    (c) a layer of material on the inner surface of the inner layer, adapted to be controllably induced to emit light.

11. Display screen as recited in claim 10, wherein said outer layer and the matrix of said inner layer have the same indices of refraction.

12. Display screen as recited in claim 11, wherein said outer layer and the matrix of said inner layer have essentially the same coefficient of thermal expansion.

13. Display screen as recited in claim 10, wherein said outer layer and the matrix of said inner layer are formulated of glass having essentially identical composition; and said fibers are formulated of light-absorbing glass.

14. Display screen as recited in claim 10, wherein said fibers are uniformly distributed in said matrix.

15. Display screen as recited in claim 10, wherein said fibers are uniformly, randomly distributed in said matrix.

16. Display screen as recited in claim 10, wherein the total volume of said fibers constitutes from about 1% to about 5% of the volume of said inner layer.

17. Display screen as recited in claim 16, wherein the total volume of said fibers constitutes on the close order of 3% of the volume of said inner layer.

18. Display screen as recited in claim 17, wherein said fibers are drawn to an average diameter of from about 1 micron to about 50 microns.

19. Display screen as recited in claim 18, wherein said fibers are drawn to an average diameter on the order of 8 microns.

20. Method of forming an image enhancing optical display screen, comprising the steps of:
    (a) uniformly distributing a small percentage of light-absorbing fibers among unclad transparent fibers to form a bundle,
    (b) fusing said bundle into a block comprising a uniformly transparent matrix with parallel light-absorbing fibers embedded in the matrix,
    (c) cutting a thick slice from said block perpendicular to said fibers,
    (d) placing the thick slice on a curved surface, while heating the slice to a temperature sufficient to cause the slice to soften and conform to the curvature of the surface,
    (e) cutting the curved thick slice in two parallel chordal planes to produce a thinner slice with parallel surfaces, and
    (f) applying a layer of material adapted to be controllably induced to emit light to one suface of said thinner slice.

21. Method as recited in claim 20, further comprising the steps of:
  (a) after cutting the thinner slice from said thick slice, fusing the thinner slice to a thick layer of material having essentially the same composition as the slice, the slice and the layer thereby forming an integral screen, and
  (b) applying a layer of material adapted to be controllably induced to emit light to the inner surface of said integral screen.

22. An optical system, comprising:
  (a) a cathode ray tube having a screen which is symmetrical to the axis of the tube, and
  (b) a lens located on the axis and externally of the cathode ray tube and having an optical center, wherein the screen consists of a layer of light-emitting particles and a layer of light-absorbing fibers directed along lines that converge on the said optical center of the lens, the fibers integrally embedded in a matrix having uniform optical and physical properties.

* * * * *